United States Patent [19]

Ishikawa et al.

[11] Patent Number: 4,737,867
[45] Date of Patent: Apr. 12, 1988

[54] POWER SAVING ARRANGEMENT IN INFORMATION RECORDING SYSTEM

[75] Inventors: Shigeki Ishikawa; Takahiro Miwa; Yoshihiko Hibino, all of Nagoya, Japan

[73] Assignee: Brother Kogyo Kabushiki Kaisha, Japan

[21] Appl. No.: 695,306

[22] Filed: Jan. 28, 1985

[30] Foreign Application Priority Data

Feb. 3, 1984 [JP] Japan .................................. 59-19259
Feb. 3, 1984 [JP] Japan .................................. 59-19260
Feb. 3, 1984 [JP] Japan .................................. 59-19261
Feb. 3, 1984 [JP] Japan .................................. 59-01963

[51] Int. Cl.⁴ ...................... G11B 19/02; G11B 21/02; G11B 5/02
[52] U.S. Cl. ...................................... 360/69; 360/61; 360/62; 360/75
[58] Field of Search ...................... 360/69, 71, 62, 61, 360/137, 73, 78, 60, 106, 75, 97–99, 100; 371/66; 369/233, 235, 243

[56] References Cited

U.S. PATENT DOCUMENTS

| | | | |
|---|---|---|---|
| 3,936,879 | 2/1976 | Gustafson | 360/99 |
| 3,956,740 | 5/1976 | Jones et al. | 360/69 |
| 4,005,493 | 1/1977 | Morgan | 360/106 |
| 4,291,346 | 9/1981 | Beecroft et al. | 360/75 |
| 4,376,293 | 3/1983 | Teramura et al. | 360/71 |
| 4,514,770 | 4/1985 | Bowden et al. | 360/69 |
| 4,516,177 | 5/1985 | Moon et al. | 360/78 |

FOREIGN PATENT DOCUMENTS 58-211359 12/1983 Japan .................................. 360/137

OTHER PUBLICATIONS

Patent Abstracts of Japan, Physical Series vol. 4, No. 160, "Drive Control Circuit of Motor for Floppy Disc" Murakami, 8/80, pp. 150 P 35.
Patent Abstracts of Japan, Physical Series, vol. 8, No. 58, "Driving Device for Floppy Disc" Nakagawa, 12/83, p. 40 P 261.
IEEE Trans. on Magnetics, vol. Mag-14, No. 4, "Microprocessor Applications in Disk Storage Systems" Johann, 7/78, pp. 203–206.
IBM TDB, vol. 19, No. 4, "Head-To-Track Syncronizing Mechanism for Magnetic Disks" Porter et al., 9/76, pp. 1393–1395.

Primary Examiner—Raymond F. Cardillo
Assistant Examiner—Steven R. Garland
Attorney, Agent, or Firm—Parkhurst & Oliff

[57] ABSTRACT

An information recording system comprising a read/write device including a read/write head for reading and writing information from and on a rotatable data-storage medium rotated by a first drive motor, and electrically operated elements such as a second drive motor for moving the read/write head relative to the data-storage medium, reading and writing amplifiers, and detectors for sensing operating conditions of the recording system such as the angular position of the data-storage medium. Electric power is supplied to such electrically operated elements from a power source via power disconnect switches connected between the power source and the respective electrically operated elements for selective power supply to the individual elements. The recording system further comprises a control device connected to the disconnect switches for controlling their operations in order to connect the power source to the respective elements only while the operation of the elements are required, and disconnect the elements from the power source when the operations of the elements are not required.

6 Claims, 10 Drawing Sheets

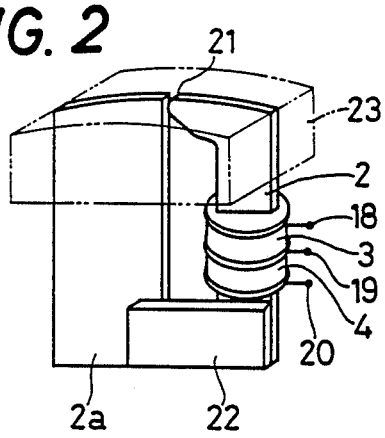
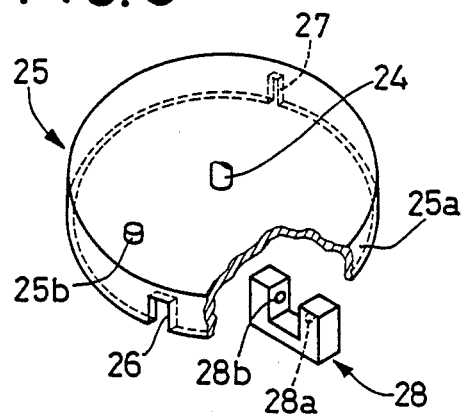
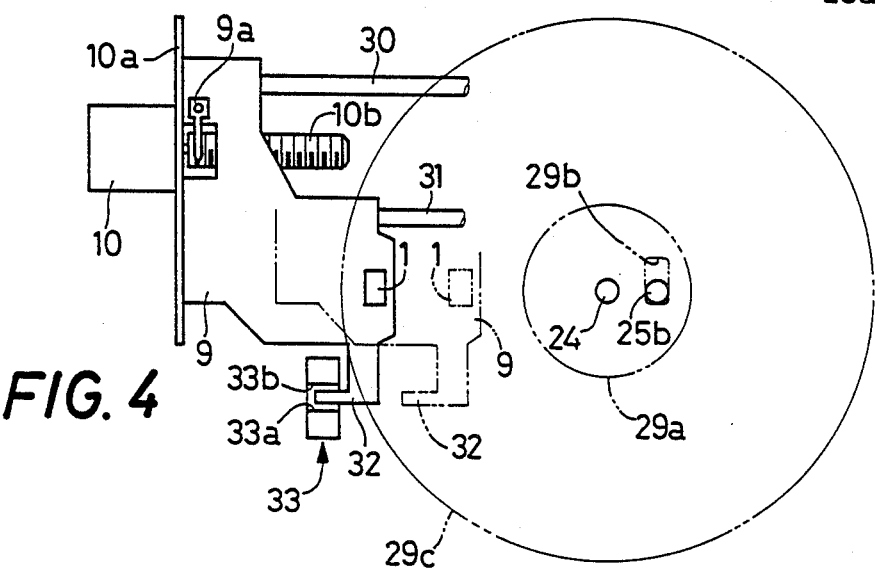
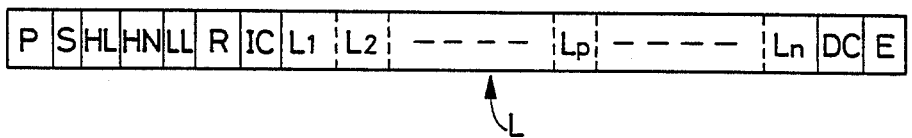

144: HAS ANY COMMAND BEEN ENTERED FROM COMPUTER 17?

149: HAVE FIVE SECONDS LAPSED WITHOUT COMMAND ENTRY?

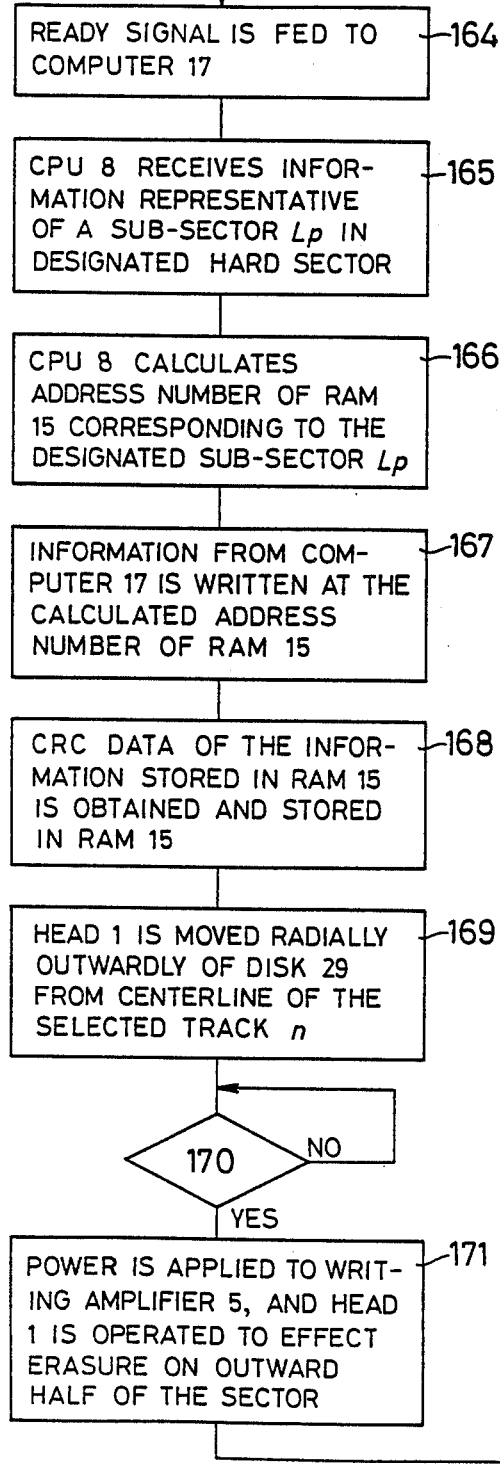
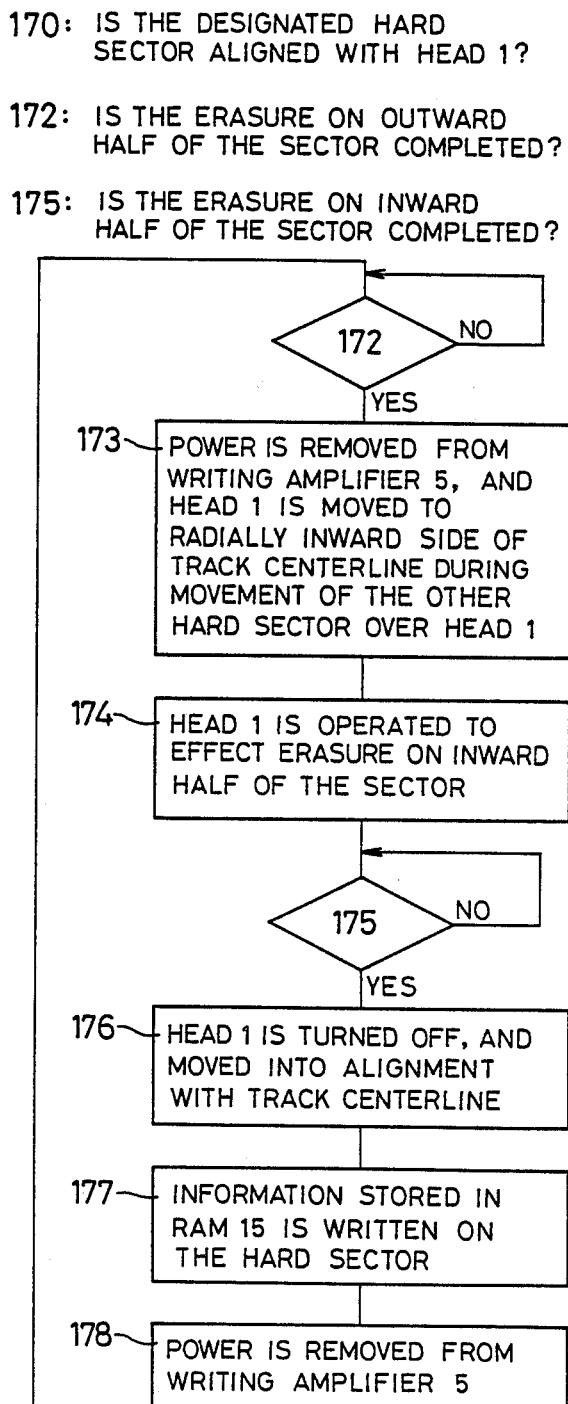
FIG. 9

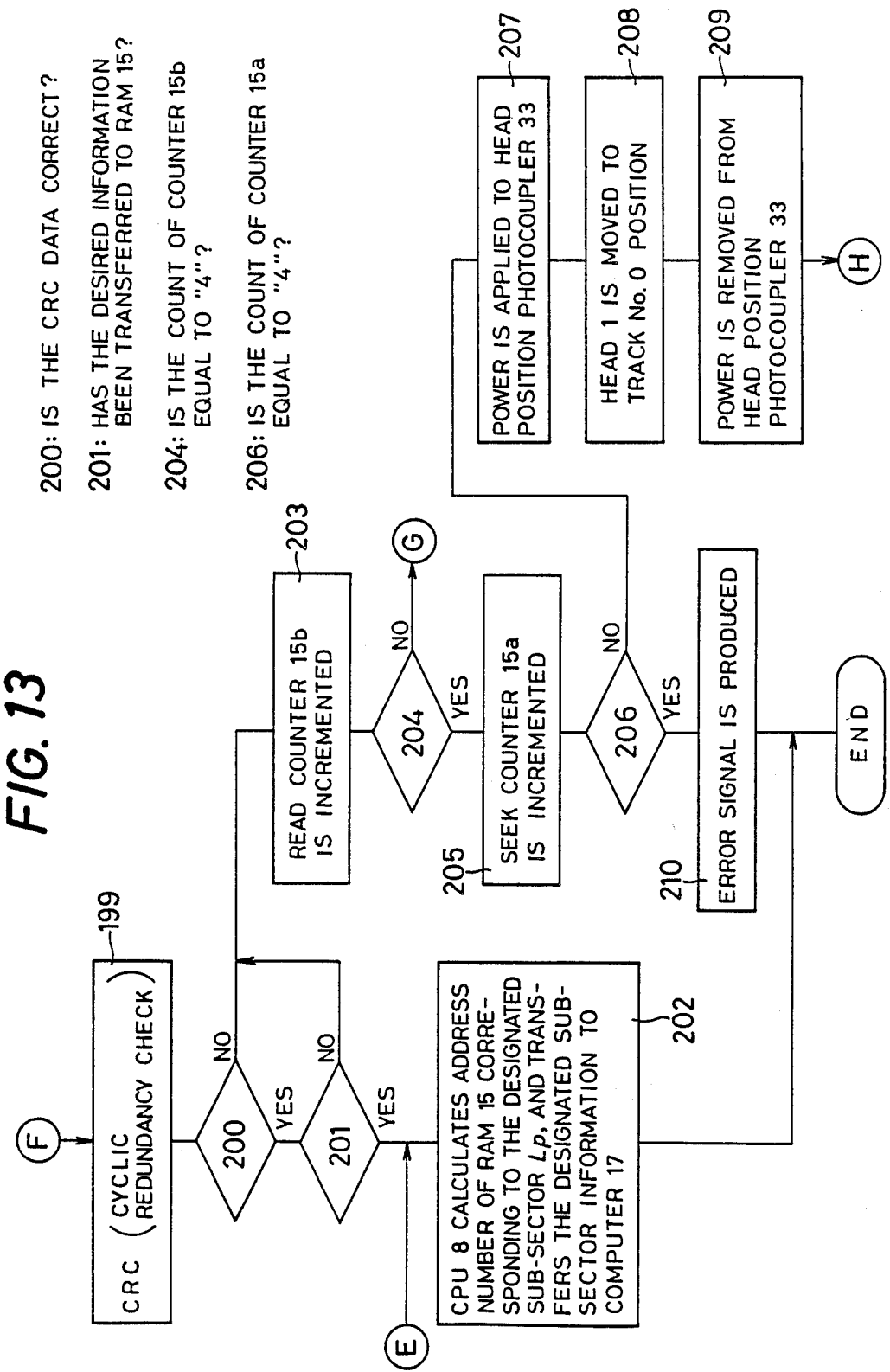

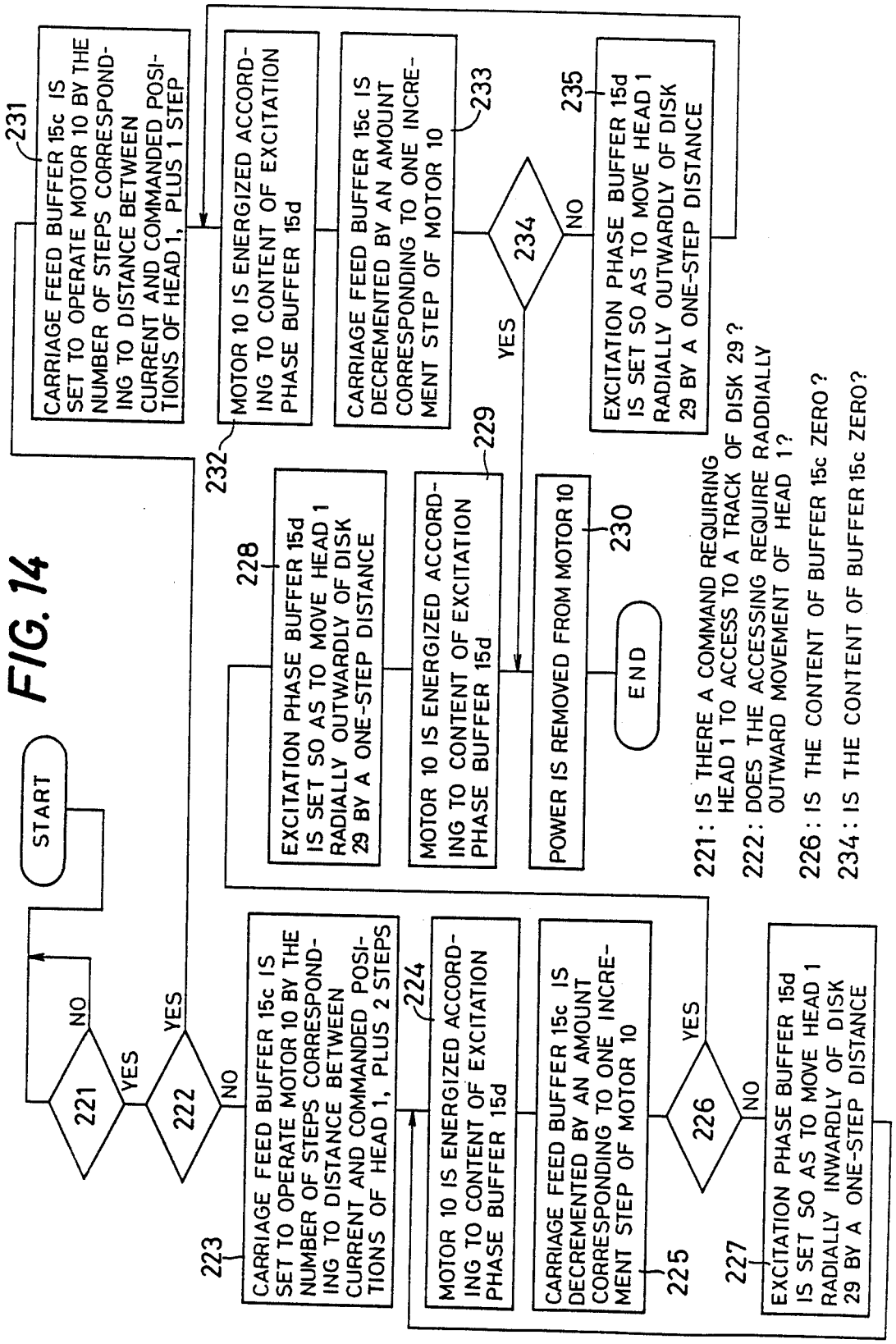

POWER SAVING ARRANGEMENT IN INFORMATION RECORDING SYSTEM

BACKGROUND OF THE INVENTION

The present invention relates in general to an information recording system capable of writing and reading information on and from a rotatable data-storage medium such as a recording disk, and more particularly to power switching arrangements for selective power supply, for maximum energy saving, to electrically operated elements used in a read/write device.

For recording or writing information on an information storage medium, there has been used a transducer head, such as a magnetic head that transforms electric variations into magnetic variations for storage on magnetic media, or a laser head that emits modulated laser beam for storage on optical media, magneto-optical media, etc.

In writing or reading information, the transducer head of the recording system must be moved relative to a rotatable recording medium substantially radially of the medium. For this purpose, a known magnetic recording system, for example, uses a drive unit for moving and positioning a magnetic head radially with respect to a rotatable magnetic data-storage medium. The magnetic recording system uses other electrically operated elements, which include: reading and writing amplifiers for amplifying input and output signals to and from the magnetic head, which signals represent input and recorded information to be written on or read from the data-storage medium; and detectors for sensing the operating conditions of the recording system such as the angular position of the data-storage medium and the reference position of the magnetic head, in order to control the recording system according to the signals from these detectors. Other types of information recording systems using a magneto-optical or other transducer head, also employ such electrically operated elements as indicated above.

Heretofore, it has been the practice to keep electric power supplied to these electrically operated elements irrespective of the need to operate the individual elements. For example, the windings of a drive motor for moving the magnetic head relative to the rotatable magnetic data-storage medium are kept energized in a given phase of excitation which was established at the end of a previous operation of the drive motor. Therefore, the power is continuously consumed by the drive motor even while the magnetic head is positioned at a given track of the data-storage medium during a period of data reading from, or writing or erasing on the data-storage medium.

Similarly, the electric power is applied to both of the reading and writing amplifiers even while the magnetic head is not operating to write or read information on or from the magnetic recording medium. Further, the electric power is generally applied to the reading amplifier while a writing or erasing operation is effected by the magnetic head. Conversely, the power supply to the writing amplifier is maintained during a reading operation of the recording system. In the same way, the electric power is always applied to the various detectors as long as the recording system is on.

However, the power supply to such electrically operated elements of the recording system is not always needed. Stated more specifically, it is not necessary to maintain the power supply to the magnetic head positioning motor while the magnetic head is performing a reading, writing or erasing operation at a selected track of the magnetic recording medium. Consequently, the conventional arrangement to keep the power supply to the head drive motor even during a data reading, writing or erasing operation of the magnetic head, will result not only in unnecessary consumption of power, but also in increased heat generation from the drive motor, which causes various troubles such as shortening of the service life of the drive motor.

It is also recognized that the power supply to the reading and writing amplifiers, and to the detectors is not always required. That is, the power supply to such components is required only when their operation is needed. In more detail, the reading amplifier, for example, should be supplied with power only when the magnetic head operates to read information from the magnetic data-storage medium, or the detector for sensing the angular position of the data-storage medium requires electric power only when it is necessary to check the angular position of the data-storage medium. The power supply to such components at other opportunities is useless, and leads to an increase in the power consumption of the recording system as a whole. In the case where the recording system is powered by a battery, this increase in the power consumption will unnecessarily shorten the battery life.

SUMMARY OF THE INVENTION

It is therefore an object of the present invention to provide an information recording system having a read/write device which operates with minimum power consumption.

It is another object of the present invention to provide an information recording system having a read/write device, which includes an arrangement for minimizing heat generation from electrically operated elements of the read/write device such as a drive motor to position a read/write head relative to a rotatable data-storage medium.

A further object of the invention is the provision of an information recording system having a read/write device, which incorporates an arrangement for maximizing the service life of electrically operated elements of the read/write device.

According to the present invention, there is provided an information recording system, comprising (a) a first drive unit for rotating a rotatable data-storage medium, (b) a read/write device including a read/write head for reading and writing information from and on the rotatable data-storage medium, and at least one electrically operated element, (c) a power source from which electric power is supplied to said at least one electrically operated element, (d) switching means, connected to the power source and said at least one electrically operated element, for selective power supply to said at least one electrically operated element, and (e) control means connected to the switching means for controlling the switching operation thereof in order to connect the power source to said at least one electrically operated element only while the operation of said element is required, and disconnect said element from the power source when the operation of the element is not required.

In the information recording system constructed as described above, electric power from the power source is supplied to the electrically operated element or elements of the read/write device, through selective actuation of the switching means by the control means, only when the operation thereof is actually required. Therefore, the conventionally experienced unnecessary power consumption is effectively minimized. Accordingly, the heat generation from such electrically operated elements is minimized, and consequently the service life of these elements is prolonged.

According to the invention, the read/write head may be a magnetic head for writing and reading information on or from a rotatable magnetic data-storage medium.

According to one embodiment of the invention as applied to write and read information on or from a magnetic data-storage medium, the above-indicated at least one electrically operated element includes a drive motor of a second drive unit for moving the magnetic head substantially radially with respect to the magnetic data-storage medium. In this case, the control means controls the operation of the switching means so as to hold the drive motor disconnected from the power source while the movement of the magnetic head is not required.

In one form of the above embodiment, a stepping motor is used as the drive motor to move the magnetic head, and the control means controls the second drive unit to re-start the drive motor by starting the energization of its windings in a phase which was established at the end of energization in a preceding operation of the drive motor. This arrangement prevents otherwise possible displacement between a rotor and a stator of the motor during its deenergization due to disconnection from the power source.

In accordance to another embodiment of the invention, the above-indicated at least one electrically operated element of the read/write device comprises a reading amplifier for amplifying output signals from the magnetic head which represent recorded information read from the magnetic data-storage medium, and a writing amplifier for amplifying input signals to the magnetic head which represent input information to be written on the magnetic data-storage medium. In this instance, the control means controls the switching means so as to connect the reading amplifier to the power source only when the operation of the reading amplifier is required, and connect the writing amplifier to the power source only when the operation of the writing amplifier is required. Obviously, the power supply to the reading amplifier, for example, is cut by the switching means while the magnetic head is operating to write or erase information on the data-storage medium.

According to a further embodiment of the invention, the at least one electrically operated element of the read/write device comprises detecting means for sensing operating conditions of the recording system. The control means controls the operation of the switching means so as to connect the detector means to the power source only while the sensing by the detector means is required. In one form of this embodiment, the detector means may include a detector disposed adjacent to a rotating member which is rotated by the first drive unit to rotate the magnetic data-storage medium. This detector senses an angular position of the rotating member. In one arrangement for sensing the angular position, the rotating member has at least one slot sensed by the detector, which may be a photoelectric switch.

According to another form of the above embodiment, the detector means includes a detector for sensing a predetermined position of the magnetic head in a radial direction of the magnetic data-storage medium. In this case, the detector may sense a position of a carriage which carries the magnetic head and which is moved by a drive motor of a second drive unit for moving the magnetic head relative to the data-storage medium. In one arrangement for sensing the carriage position, the carriage is provided with a dog which is sensed by the detector when the magnetic head carried by the carriage is aligned with a radially outermost data track of the magnetic data-storage medium.

According to a further form of the above embodiment, the detector means comprise a write protect detector for checking if the writing of information into the data-storage medium is possible or not. The write protect detector may sense a write pocket tab provided on a cartridge accommodating the data-storage medium.

It is noted that the switching means provided according to the present invention may comprise plural power disconnect switches provided between the power source, and the respective electrically operated elements of the read/write device. The individual disconnect switches are controlled by the control means according to the requirement of operation of the corresponding elements. However, it is possible that the switching means consists of a single power disconnect switch. In this instance, the disconnect switch disconnects the power source when none of the electrically operated elements of the read/write device are required to operate.

BRIEF DESCRIPTION OF THE DRAWING

The foregoing and other objects, features and advantages of this invention will become more apparent from reading the following preferred embodiment taken in connection with the accompanying drawing in which:

FIG. 2 is a perspective view of a magnetic head used in the magnetic recording system of FIG. 1;

FIG. 3 is a perspective view of a rotating member for supporting and rotating a magnetic recording disk, and an angular position detector to sense the angular position of the rotating member;

FIG. 4 is a schematic elevational view showing a carriage movable to position the magnetic head relative to the magnetic recording disk, and a linear position detector to sense the predetermined position of the magnetic head radially with respect to the magnetic recording disk;

FIG. 5(a) is an illustration of a format of data storage on each hard sector of the recording disk;

FIG. 5(b) is a table relating to the division of each logical sector of the recording disk;

FIGS. 8, 9 and 10 are flow charts illustrating a data writing operation of the recording system;

FIGS. 12 and 13 are flow charts representing a data reading operation of the recording system; and FIG. 14 is a flow chart showing an operation to position the magnetic head.

DETAILED DESCRIPTION OF THE PREFERRED EMBODIMENT

Referring to the accompanying drawing, the present invention will be more fully described in its preferred embodiment. It is to be understood, however, that the invention is not confined to the precise disclosure, and that various changes, modifications and improvements may be made herein which do not affect the spirit of the invention nor exceed the scope thereof as defined in the appended claims.

Figure 1:
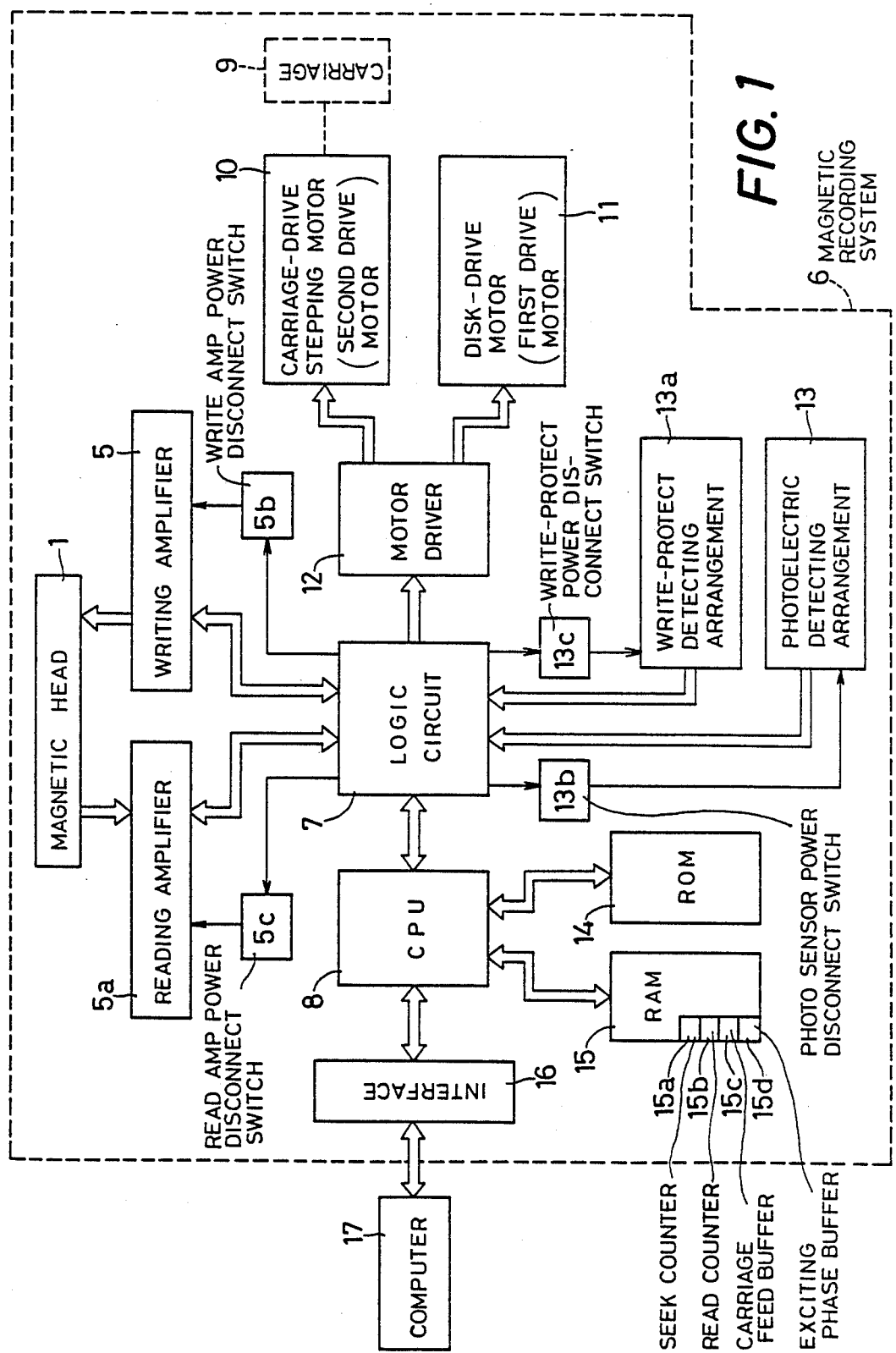
FIG. 1 is a block diagram of one embodiment of a information recording system of the present invention in the form of a magnetic recording system.

There is shown in FIG. 1 a magnetic recording system generally indicated at 6, which includes a magnetic head 1 of FM type operable to effect writing (recording), reading (playing back) and erasing of information on or from a recording medium in the form of a magnetic disk 29 (FIG. 4) accommodated in a cartridge. More particularly, the magnetic head 1 has two core pieces (yokes) 2, 2a, and coils 3, 4 wound around the core piece 2, as shown in FIG. 2. The maganetic head 1 is connected to a writing amplifier 5 which controls current flows through the coils 3, 4, and to a reading amplifier 5a which amplifies output signals from the magnetic head 1. The recording system 6 further includes a logic circuit 7 through which logic signals are exchanged between various elements of the magnetic recording system 6, and a central processing unit 8 (hereinafter referred to as CPU) to which the writing and reading amplifiers 5, 5a are connected via the logic circuit 7. As shown in FIG. 4, the magnetic head 1 is mounted on a carriage 9 which is moved through rotation of a lead screw 10b connected to a carriage-drive stepping motor 10 mounted on a bracket 10a. With the stepping motor 10 operated according to the number of command pulses, the carriage 9 is moved to position the magnetic head 1 in a radial direction of the magnetic recording disk 29, which is rotated by a disk-drive motor 11. The carriage-drive motor 10 and the disk-drive motor 11 are both operated under the control of a motor driver 12 which is connected to the CPU 8 via the logic circuit 7. The magnetic recording system 6 further includes a photoelectric detecting arrangement 13 and a write-protect detecting arrangement 13a which are connected to the CPU 8 via the logic circuit 7. The photoelectric detecting arrangement 13 includes an INDEX photocoupler 28, as shown in FIG. 3, which senses an angular position of the recording disk 29 to detect the beginning of each data-storage hard sector in each track of the recording disk 29, and a HEAD POSITION photocoupler 33, as shown in FIG. 4, which senses the position of the carriage 9 carrying the magnetic head 1, and consequently the position of the magnetic head 1 at which the magnetic head 1 is aligned with the radially outermost data track, i.e., track No. 0 of the magnetic recording disk 29. The write-protect detecting arrangement 13a senses a WRITE PROTECT tab which is provided on the cartridge of the recording disk 29 for the purpose of preventing the erasure of information which has been written on the recording disk 29. When the WRITE PROTECT tab is sensed by the detecting arrangement 13a, a WRITE PROTECT signal is produced from the detecting arrangement 13a and fed to the logic circuit 7.

As depicted in FIG. 1, a WRITE AMP power disconnect switch 5b is connected between the writing amplifier 5 and the logic circuit 7, while a READ AMP power disconnect switch 5c is connected between the reading amplifier 5a and the logic circuit 7. Similarly, PHOTO SENSOR and WRITE PROTECT power disconnect switches 13b and 13c are connected between the logic circuit 7, and the photoelectric detecting arrangement 13 and write-protect detecting arrangement 13a, respectively.

The magnetic recording system 6 uses a ROM 14 (read-only memory) which stores various data processing programs, and a RAM 15 (random access memory). The ROM 14 and RAM 15 are connected to the CPU 8. The RAM 15 includes: a SEEK counter 15a for counting and storing the number of positioning of the magnetic head 1 at the track No. 0 of the magnetic recording disk 29 for seeking a desired track (more precisely, a desired hard sector) of the recording disk 29; a READ counter 15b for counting and storing the number of data reading from the recording disk 29; a CARRIAGE FEED counter 15c for storing an amount of operation of the carriage-drive stepping motor 10; an EXCITATION PHASE buffer 15d for storing the last excitation phase of the carriage-drive stepping motor 10; and other buffers for temporary data storage. The instant recording system 6 is coupled to an external host instrument in the form of a computer 17, via an interface 16 connected to the CPU 8 of the system 6.

The two coils 3, 4 wound on the core piece 2, which is made of ferrite, are provided with three terminals 18, 19 and 20, as illustrated in FIG. 2. Upon writing of information on the recording disk 29, an electric current is caused to flow either in a direction from the terminal 18 toward the terminal 19, or in a direction from the terminal 20 toward the terminal 19, selectively depending upon the information to be written on the disk 29. That is, the magnetic head 1 is capable of recording two kinds of signals corresponding to two different directions of magnetization of the memory areas on the magnetic disk 29. When the stored or recorded information is read from the magnetic recording disk 29, the two coils 3, 4 operate as if they were a single coil having the terminals 18 and 20. In erasing the recorded information, the memory areas are magnetized all in the same direction in which the memory area storing the last bit of the information written last by the magnetic head 1 is magnetized. The magnetization of the memory areas of the magnetic disk 29 is effected when the memory area moves past a gap 21 defined by the opposed ends of the two core pieces 2, 2a which are fixed to each other by a back bar 2. The two core pieces 2, 2a and the back bar 22 cooperate to constitute a magnetic path which is continuous except at the gap 21. A pair of slipper supports 23 made of barium titanate are disposed on both sides of the contact portion of the head core 2, 2a with which the magnetic disk 29 moves in sliding contact. The rotating magnetic disk 29 is supported by the slipper supports 23 in sliding contact therewith.

As shown in FIG. 3, a spindle 24 driven by the disk-drive motor 11 is fixed to a rotating member 25 which has a first and a second slot 26, 27 formed in its peripheral wall 25a. The second slot 27 is smaller in width than the first slot 26, and spaced from the first slot 26 by 180 degrees circumferentially of the rotating member 25, i.e., located diametrically opposite to the first slot 26. As shown in FIG. 4, the magnetic disk 29 includes a core metal portion 29a which has a drive aperture 29b offset from its center hole. To drive the disk 29, the rotating member 25 carries a drive pin 25b which is offset from the spindle 24, so that the drive pin 25b may engage the drive aperture 29b formed in the recording disk 29 to rotate the disk 29. Since the drive pin 25b is kept in forced abutting contact with the inner wall of the drive aperture 29b while the spindle 24 is rotated, the disk 29 is positioned accurately in its circumferential direction with respect to the drive pin 25b. That is, the magnetic disk 29 is held in the predetermined position relative to the first and second slots 26, 27. The first slot 26 corresponds to the beginning of a hard sector whose identification number is smaller than the other hard sector in the same track of the recording disk 29. The second slot 27 corresponds to the beginning of the other hard sector. The previously indicated INDEX photocoupler 28 has a light emitting element in the form of an LED 28a, and a light receiver in the form of a phototransistor 28b. The photocoupler 28 is disposed such that the light from the LED 28a toward the phototransistor 28b is normally intercepted by the peripheral wall 25a of the rotating member 25. However, when the first and second slots 26, 28 are moved past the light path between the LED 28a and the phototransistor 28b, different detection signals are generated from the photocoupler 28, whereby the angular index position of the rotating member 25, and therefore of the magnetic disk 29 is sensed. In other words, the two slots 26, 27 formed in the peripheral wall 25a of the rotating member 25 in the diametrically opposite positions, are provided to sense two index positions which define the two separate hard sectors for each and every individual track of the magnetic disk 29.

As illustrated in FIG. 4, the carriage 9 on which the magnetic head 1 is mounted is slidably moved on two parallel guide bars 30, 31 which are supported at one end thereby by the motor bracket 10a, and at the other end by the frame of the magnetic recording system 6. The carriage 9 has an engagement piece 9a fixed at its one end so as to engage the lead screw 10b coupled to the drive shaft of the carriage-drive stepping motor 10. With the lead screw 10b rotated by the motor 10, the carriage 9 is slidably moved on the guide bars 30, 31, so that the magnetic head 1 is positioned radially of the magnetic recording disk 29 whose outer periphery is indicated at 29c. Described in more detail, the magnetic head 1 is moved from its first position in alignment with track No. 0 (outermost track) of the disk 29 as indicated in solid line in FIG. 4, to its second position in alignment with track No. 39 (innermost track) of the disk 29 as indicated in broken line. That is, the magnetic head 1 may be positioned at the desired one of the 40 tracks (No. 0 through No. 39). The magnetic disk 29 is positioned with its center hole and drive aperture 29b engaging the spindle 24 and drive pin 25b, respectively, and pressed by a pad (not shown) against the magnetic head 1 so that its surface is moved in sliding contact with the magnetic head 1. As indicated in FIG. 4, the carriage 9 is formed with a dog 32 which cooperates with the previously indicated HEAD POSITION photocoupler 33 to sense the first position of the magnetic head 1 in alignment with the track No. 0 of the magnetic disk 29. More specifically, when the carriage 9 is positioned with the magnetic head 1 located at its first position (track No. 0 position), the light path between an LED 33a and a phototransmitter 33b of the photocoupler 33 is intercepted by the dog 32 interposed between the LED 33a and phototransistor 33b. At this time, the photocoupler 28 produces a detection signal indicating that the magnetic head 1 is aligned with the track No. 0 position.

FIG. 5(a) indicates a format of data storage in each hard sector of the magnetic recording disk 29. Character "P" represents a pre-data area wherein data "0, 0, 0, ... 0" are stored. Character "S" represents a start mark which consists of eight bits of data "0, 0, 0, 1, 0, 0, 0, 0". Characters "HL" next to "S" represent an area for storing data indicative of the length of a hard sector. Characters "HN" represent an area for storing data indicative of identification number of the hard sector. In the present embodiment, each of the 40 tracks of the disk 29 is divided into two hard sectors, as previously described. Thus, the disk 29 has a total of 80 hard sectors. The hard sector number data in the area HN consists of the least significant bit representing one of the two hard sectors in the appropriate track, and the remaining bits representing the appropriate one of the 40 tracks. Characters "LL" next to "HN" represent an area for storing data indicative of one of seven codes LL "0" through "6" corresponding to seven different lengths of each individual sub-sector Lp of a logical sector L included in each hard sector. The desired length of the sub-sector Lp is designated with the appropriate code LL which is entered from the external host computer 17. The logical sector L is used to store information sent from the computer 17. According to the entered code LL, the logical sector L is divided into sub-sectors L1 through Ln each of which has an equal byte length corresponding to the code LL as indicated in FIG. 5(b). As shown in the same figure, the codes LL "0", "1", "2", "3" "4", "5" and "6" correspond to the numbers of bytes "64", "80", "128", "256", "512", "1024" and "1280", respectively. The number "n" of the sub-sectors Lp is determined so that the total number of bytes of the logicl sector L is equal to 1280 if the value 1280 is a multiple of bytes of the sub-sector Lp designated by the code LL, but equal to 1024 if the value 1280 is not a multiple of the designated number of bytes of the sub-sector Lp. FIG. 5(b) indicates the number of bytes of each sub-sector Lp, the total number of bytes of the logical sector L and the number n of sub-sectors Lp, in relation to the codes LL. Although the total length (number of bytes) of the logical sector L is equally divided into the sub-sectors LP in this specific example, it is possible that the logical sector L consists of sub-sectors Lp of equal length, and the remaining portion which can not be accessed.

Character "R" represents an area which is reserved for the user to write desired information such as file identification data, or data indicative of the inhibition of erasure of the information stored in the appropriate logical sector L. The information in this area "R", which is accessed through the computer 17, is used to find out a desired information in the magnetic disk 29. Characters "IC" represent an ID field, i.e., an area for storing CRC (cyclic redundancy check) data of the data stored in the areas "HL" through "R". Characters "DC" represent an area for storing CRC data of the data stored in the logical sector L. Character "E" represents a post-data area wherein data "0, 0, 0 ... 0" are stored as in the pre-data area "P".

Figure 6:
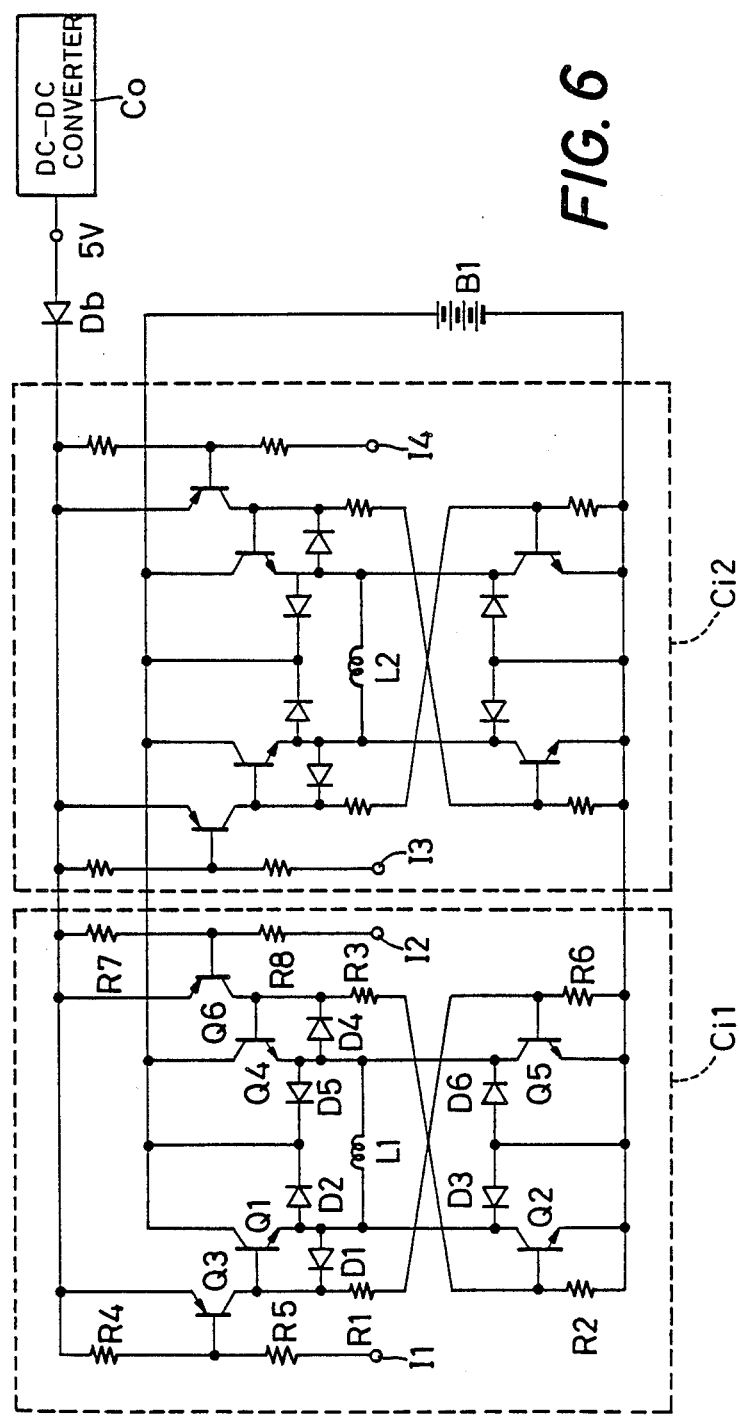
FIG. 6 is a diagram of an excitation circuit of a stepping motor to position the magnetic head.

Referring next to FIG. 6, excitation circuits of the carriage-drive stepping motor 10 will be described.

Coils L1 and L2 are energized independently of each other, by two circuits Ci1 and Ci2 of the same arrangement, respectively. The left terminal (as seen in FIG. 6) of the coil L1 is connected to anodes of protective diodes D1 and D2, to an cathode of a protective diode D3, to an emitter of a transistor Q1, and to a collector of a switching transistor Q2. To a base of the transistor Q1 are connected a collector of a switching transistor Q3, a cathode of the diode D1 and a resistor R1. Resistors R2 and R3 are connected to a base of the switching transistor Q2. To a base of the transistor Q3 are connected resistors R4 and R5. A collector of the transistor Q1 and a cathode of the diode D2 are connected to a power source of a 6V battery B1. The end of the resistor R2 not connected to the transistor Q2, an emitter of the transistor Q2 and an anode of the diode D3, are held at 0V. The end of the resistor R4 not connected to the base of the transistor Q3, and an emitter of the transistor Q3 are connected to a cathode of a diode Db, an anode of which is connected to the battery B1 via a DC-DC converter Co, so that a stabilized voltage of 5V is applied to the diode Db. The resistor R5 is connected to an input terminal I1 which receives EXCITATION signals from the CPU 8 that represent excitation phases of the carriage-drive stepping motor 10.

The stepping motor 10 is so designed that it is operated at a predetermined velocity when a voltage of 3.6V is applied to the coils L1 and L2.

In each of the circuits Ci1 and Ci2, the above indicated elements are arranged symmetrically with respect to the respective coil L1 or L2. Namely, in the circuit Ci1, the transistors Q1, Q2 and Q3 correspond to the transistors Q4, Q5 and Q6, while the diodes D1, D2 and D3 correspond to the diodes D4, D5 and D6. Further, the resistors R1, R2, R4 and R5 correspond to the resistors R3, R6, R7 and R8. The input terminal I1 corresponds to an input terminal I2.

The circuit Ci2, which is completely identical in arrangement to the circuit Ci1, has input terminals I3 and I4.

The operation of the magnetic recording system 6 constructed as described heretofore will be described, referring particularly to FIGS. 7-14.

Figure 7:
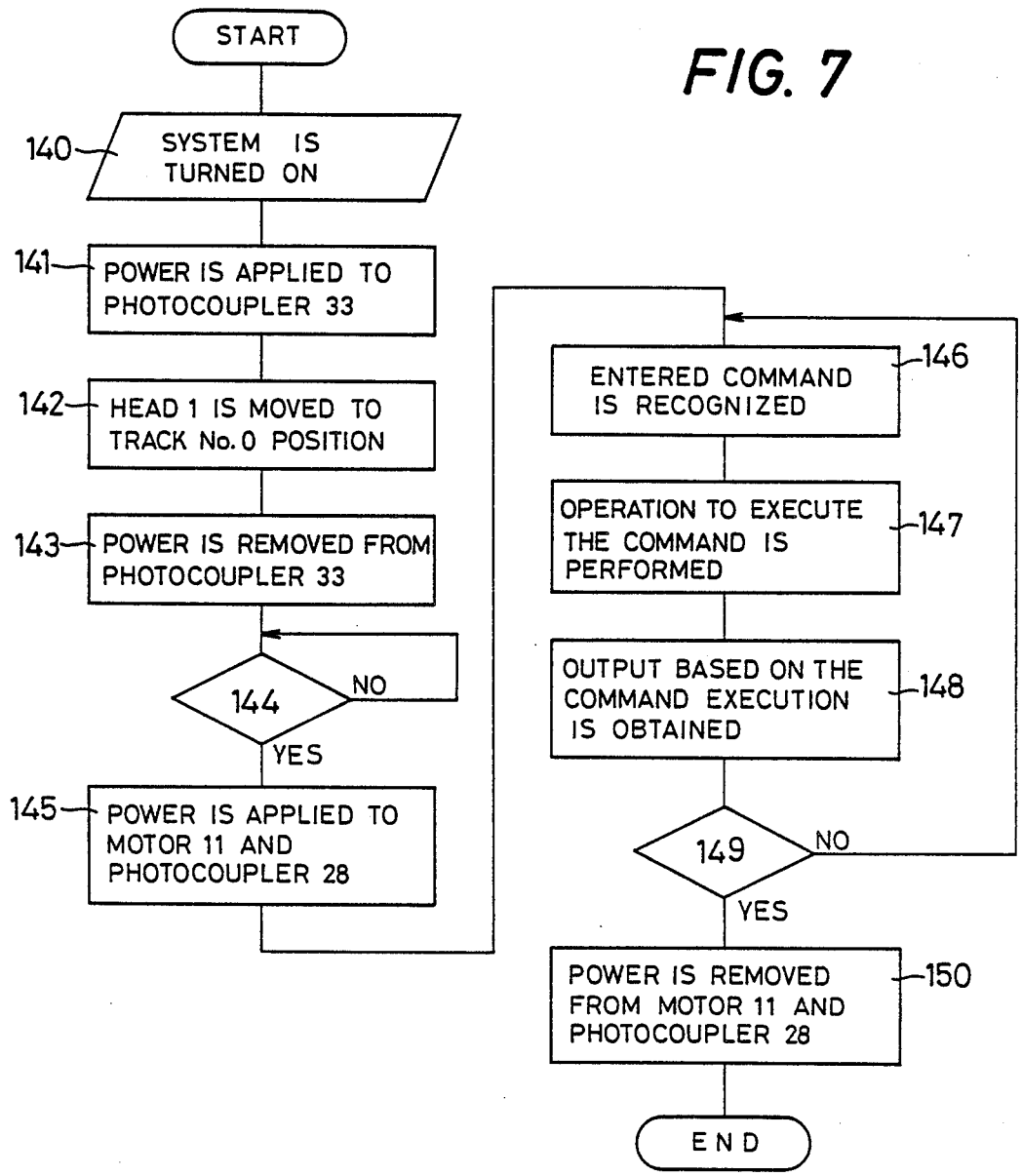
FIG. 7 is a flow chart showing generally the operation of the recording system as a whole.

At first, the magnetic recording system 6 is turned on as indicated at 140 in FIG. 7. Then, the following sequence of operation is performed according to programs stored in the ROM 14, under the control of the CPU 8. In the first Step 141, the PHOTO SENSOR power disconnect switch 13b is turned on to apply power to the HEAD POSITION photocoupler 33 to check if the magnetic head 1 on the carriage 9 is located in alignment with the track No. 0 of the recording disk 29. Then, the CPU 8 goes to Step 142 wherein the magnetic head 1 is moved to the track No. 0 position. Successively, power is removed from the photocoupler 33 in Step 143. This Step is followed by Step 144 in which the CPU 8 checks if any command has been entered through the host computer 17. If not, the CPU 8 waits for the entry of any command. In the case any command has been entered, the CPU 8 goes to Step 145 to apply power to the disk-drive motor 11, and to the INDEX photocoupler 28 to sense the angular indexing position of the recording disk 29. That is, the disk 29 is rotated and the power disconnect switch 13b is turned on to enable the photocoupler 28 to operate. Successively, the CPU 8 goes to Step 146 to recognize the entered command, and to step 147 to perform the operation necessary to execute the entered command. This operation includes: generation of an error signal if the entered command from the computer 17 is erroneous; initializing routine to write ID field data in the disk 29, and store signals "0" in the memory areas where no information has been stored; information writing and reading routines, etc. Then, Step 148 is executed to provide an output based on the operation in step 147, such as a signal indicating the termination of the operation according to the enrtered command. The CPU 8 then goes to Step 149 to check if a time interval of five (5) seconds has lapsed after the entry of the last command from the computer 17, i.e., to check whether five seconds have passed without an access to the recording system 6 from the computer 17. If any command is entered within this time period, the Step 149 is followed by the Step 146 to execute the similar operations. If five seconds have passed without a command entered from the computer 17, the CPU 8 goes to Step 150 to remove power from the disk-drive motor 11 and from the INDEX photocoupler 28.

Figure 8:
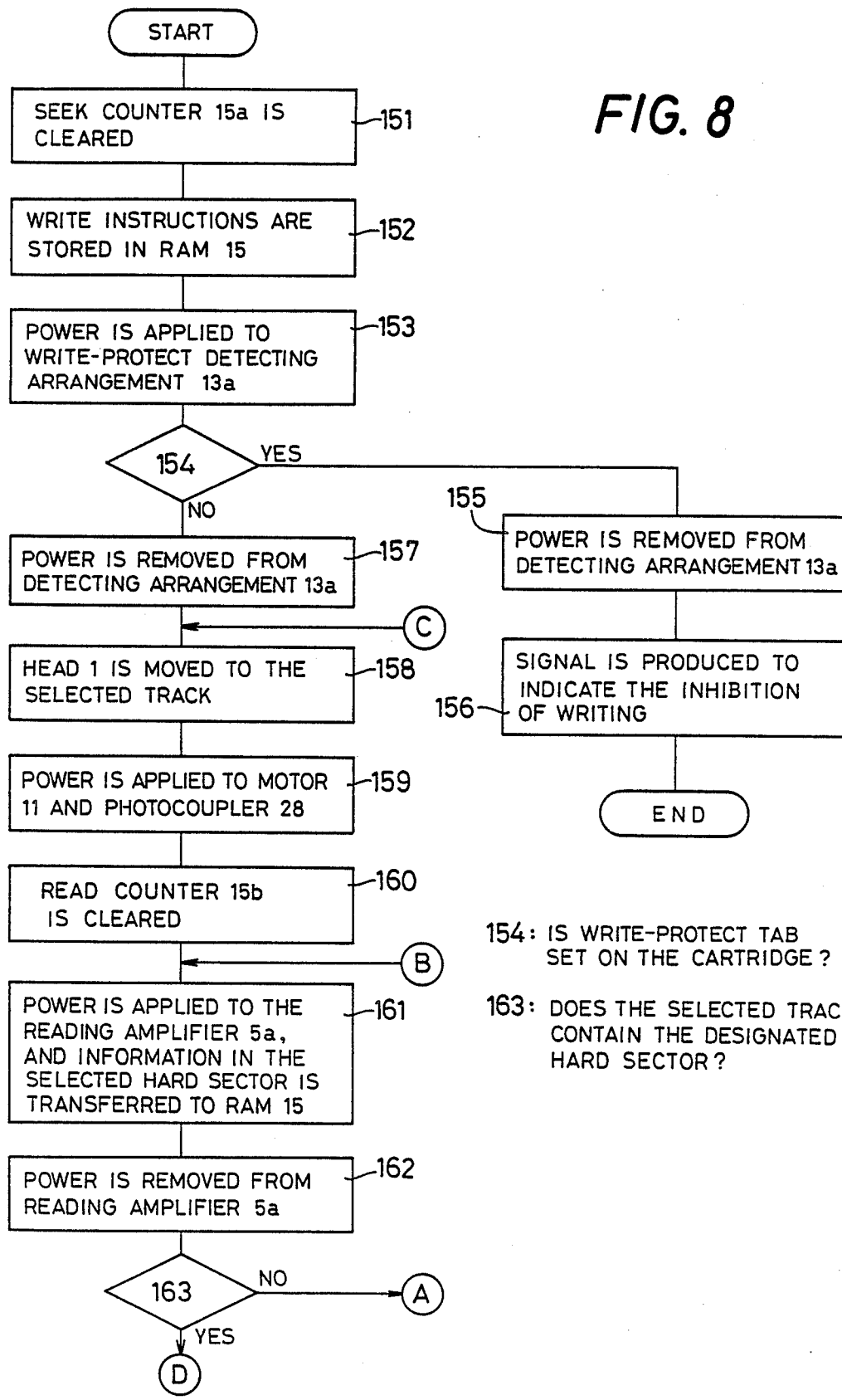
Figure 10:
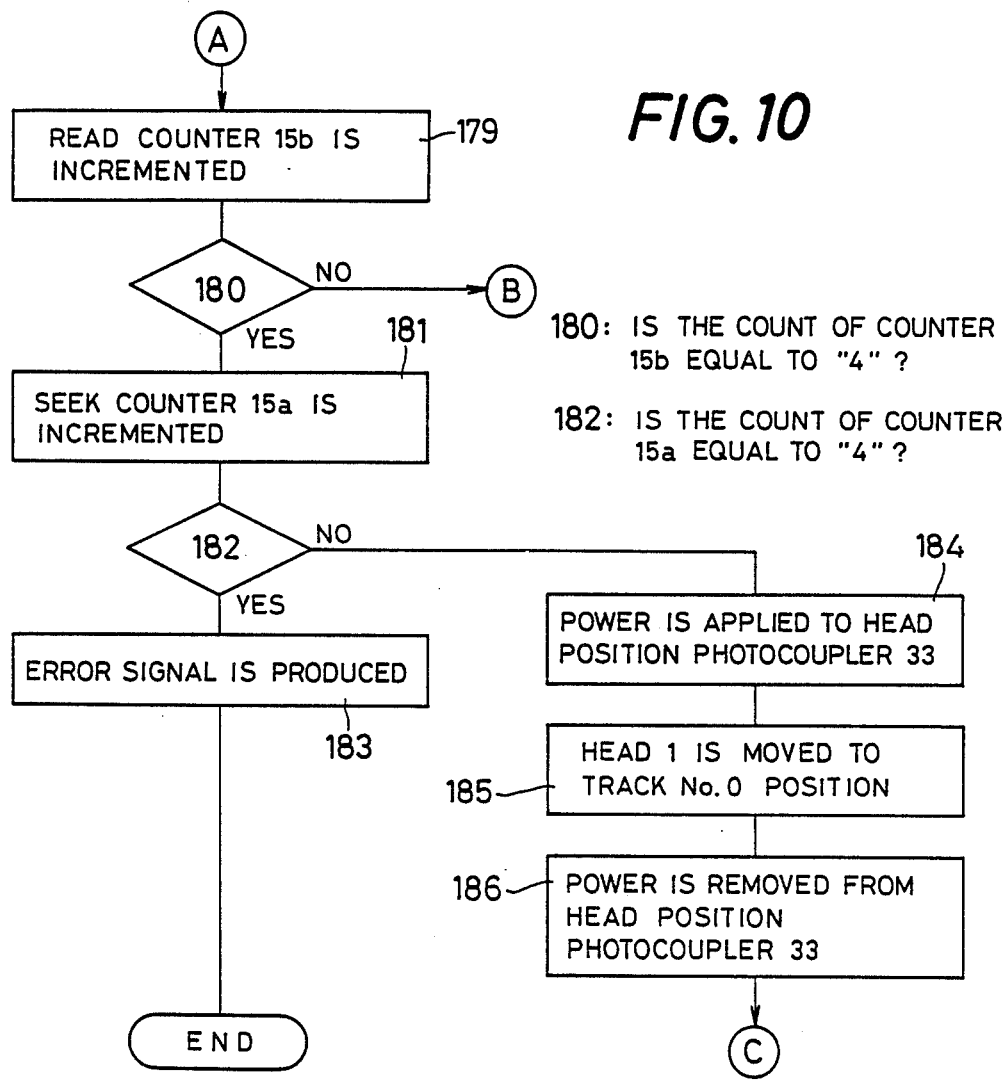

Referring to FIGS. 8-10, the information writing routine as part of the operation in Step 147 will be described in greater detail.

At first, Step 151 is executed to clear the SEEK counter 15a of the RAM 15. This step is followed by Step 152 to transfer WRITE instructions from the computer 17 to the RAM 15, which WRITE instructions include data indicative of the identification number of a hard sector on which information from the computer 17 is written. Then, the CPU 8 goes to Step 153 wherein WRITE PROTECT power disconnect switch 13c is turned on to apply power to the write-protect detecting arrangement 13a, whereby the detecting arrangement 13a is ready to sense the WRITE PROTECT tab on the cartridge which accommodates the recording disk 29. Successively, the CPU 8 goes to Step 154 wherein the detecting arrangement 13a checks if the WRITE PROTECT tab is set on the cartridge to inhibit the erasure of the stored information, i.e., to inhibit the writing of new information. If the WRITE PROTECT tab is found to have been set, the Step 154 is followed by Step 155 to turn off the WRITE PROTECT power disconnect switch 13c and remove power from the detecting arrangement 13a. Then, the step 155 is followed by Step 156 to produce a write-protect signal indicating the inhibition of writing of new information and terminate the writing routine. The write-protect signal is fed to the computer 17. In the case where the tab is not set, the CPU 8 goes to Step 157 to remove power from the detecting arrangement 13a, and then to Step 158 to read out from the RAM 15 the hard sector identification number data (which has been stored in Step 152), and seek the track containing identified hard sector, that is, move the magnetic head 1 to the corresponding radial position on the recording disk 29. Successively, the CPU 8 goes to Step 159 wherein power is applied to the disk-drive motor 11 and to the INDEX photocoupler 28. This Step 159 is followed by Step 160 wherein the READ counter 15b is cleared, and then by Step 161 to turn on the READ AMP power disconnect switch 5c to apply power to the reading amplifier 5a, and read the information in the accessed hard sector and store it in the RAM 15. Then, the power disconnect switch 5c is turned off, in Step 162, to remove power from the reading amplifier 5a. The CPU 8 then goes to Step 163 to check if the track of the disk 29 at which the magnetic head 1 is currently positioned, contains the hard sector designated by the identification number data (stored in the RAM 15 in the Step 161) except the least significant bit. If the designated hard sector exits in the currently selected track, the CPU goes to Step 164 shown in FIG. 9, to feed to the computer 17 a READY signal indicating that the recording system 6 is ready to write information on the designated hard sector. Subsequently, the CPU 8 goes to Step 165 to receive from the computer 17 information which selects a sub-sector Lp from among plural sub-sectors L1-Ln of the logical sector L of the designated hard sector. The Step 165 is followed by Step 166 wherein the CPU 8 calculates the address number of the RAM 15 which corresponds to the selected sub-sector Lp. In the present embodiment, this address number of the RAM 15 is calculated by multiplying the length (number of bytes) of the sub-sector Lp designated by the code LL of FIG. 5(b), by a value which is the sub-sector number "p" minus one (1), and then adding to the obtained product the start address number of the RAM 15 from which the information is written. The CPU 8 then goes to Step 167 where the CPU 8 receives from the computer 17 the information to be written, and write the received information at the address number of the RAM 15 obtained in the Step 166. Successively, Step 168 is executed to obtain the CRC data of the information stored in the RAM 15 in Step 167, and the obtained CRC data is stored in the RAM 15. The CPU 8 goes to Step 169 to move the magnetic head 1 radially outwardly of the recording disk 29 by a distance (125 microns) corresponding to two command pulses of the stepping motor 10, from the centerline of the selected track n which includes the designated hard sector, as indicated at 1a in FIG. 11.

Figure 11:
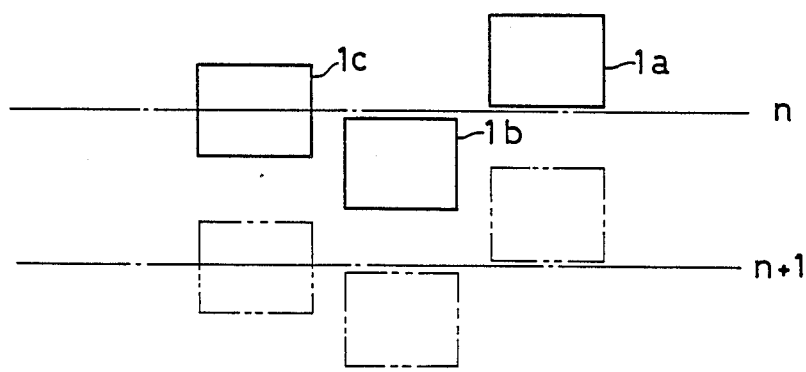
FIG. 11 is a view showing a positional relation between the magnetic head and data tracks of the recording disk.

Although the centerlines of the tracks "n−1", "n" and "n+1" are indicated in straight broken lines in FIG. 11, they are acutually circular lines. The distance between the centerlines of the adjacent tracks is 375 microns correspinding to six command pulses of the motor 10. Upon erasure of information on the track n, the magnetic head 1 is located at the position indicated at 1a to erase one side of the centerline of the track n, and then located at the position indicated at 1b to erase the other side of the centerline. When the information is written on or read from that track, the magnetic head 1 is located at the position indicated at 1c. Similar positions of the magnetic head 1 with respect to the track "n+1" are indicated by blocks in two-dot chain lines.

Subsequently, the CPU 8 goes to Step 170 wherein the CPU 8 checks for the signal generated from the INDEX photocoupler 28 which cooperates with the rotating member 25 rotating with the disk 29 to sense the angular position of the disk 29. In this Step 170, therefore, the CPU 8 checks to see whether the designated hard sector is aligned with the magnetic head 1. If the hard sector is not located opposite to the magnetic head 1, the disk 29 is rotated continuously until the signal from the photocoupler 28 is produced. If the hard sector is positioned opposite to the magnetic head 1, the CPU 8 goes to Step 171 to turn on the WRITE AMP power disconnect switch 5b to apply power to the writing amplifier 5, and energize the magnetic head 1 so as to effect erasure on the radially outward half of the hard sector. Subsequently, Step 172 is executed to check if the erasure of the hard sector on its outward side is completed or not. This checking is achieved by sensing a variation in the signal from the INDEX photocoupler 28 due to passage of the light from the emitter LED 28a to the phototransistor 28b through the slots 26, 27. If the erasure is not completed, the erasing operation is continued. When the erasure is completed, the CPU 8 goes to Step 173 to remove power from the magnetic head 1, and move the magnetic head 1 to the radially inward side of the centerline of the track n (offset from the centerline by a distance of 125 microns corresponding to two command pulses), as indicated at 1b in FIG. 11. This movement of the magnetic head 1 is taken while the recording disk 29 is rotated with the other hard sector moving over the magnetic head 1. Then, Step 174 is performed to actuate the magnetic head 1 to effect the erasure on the inward half of the hard sector. The CPU 8 then goes to Step 175 to check if the erasure on the inward side of the track centerline is completed. The erasure is continued until it is completed. Upon completion of the erasure, the CPU 8 executes Step 176 wherein power is removed from the magnetic head 1, and the magnetic head 1 is moved into alignment with the centerline of the track n, as indicated at 1c in FIG. 11. The Step 176 is followed by Step 177 wherein the magnetic head 1 is energized according to the information from the computer 17 which has been stored in the RAM 15. Thus, the information from the computer 17 is written in the designated hard sector on the track n. The CPU 8 then goes to Step 178 to turn off the WRITE AMP power disconnect switch 5b to remove power from the writing amplifier 5.

When the information stored in a hard sector of the recording disk 29 is partially corrected, the whole portion of the information from "HL" through "DC" of FIG. 5(a) containing a part of the information to be corrected, is read out from the disk 29 and transferred to the RAM 15. Then, the appropriate part of the information in the RAM 15 is corrected (edited) as needed, and the whole information in the RAM 15 containing the corrected information is written into the appropriate hard sector of the disk 29 in a manner as described hitherto.

If the checking in the previously described Step 163 of FIG. 8 reveals that the selected track does not contain the designated hard sector, the CPU 8 goes to Step 179 of FIG. 10 to increment the READ counter 15b of the RAM 15. The step 179 is followed by Step 180 to check if the current count of the READ counter 15b is equal to "4" or not. If not, the CPU 8 goes gack to Step 161 of FIG. 8. If the count of the counter 15b is equal to "4", the next Step 181 is executed to increment the SEEK counter 15a of the RAM 15. In other words, in the case where the selected track does not contain the hard sector whose identification number was read in Step 161, accessing to the designated hard sector is attempted up to four times. The Step 181 is followed by Step 182 to check if the current count of the SEEK counter 15a is equal to "4" or not. If the count is "4", the following Step 183 is executed to produce an ERROR signal. This signal is fed to the computer 17. If the count of the SEEK counter 15a is not equal to "4", the Step 182 is followed by Step 184 wherein the PHOTO SENSOR power disconnect switch 13b is turned on to apply power to the HEAD POSITION photocoupler 33. Successively, the CPU 8 executes Step 185 wherein the magnetic head 1 is moved to the track No. 0 position; and goes to Step 186 to remove power from the photocoupler 33. Then, the CPU 8 goes back to the Step 158. This means that the magnetic head 1 is moved to the track No. 0 position if the desired hard sector is not accessed even after the access to the disk 29 in the Step 161 has been attempted four times. With the magnetic head 1 located at the track No. 0 position, the accessing to the desired hard sector is again tried up to four times. If the desired hard sector is not accessed within four times of trials, the magnetic head is again returned to the track No. 0 position for further accessing attempts. In the event the desired hard sector is not accessed before the SEEK counter 15a has been incremented to "4", the ERROR signal is applied to the computer 17 in the previously indicated Step 183.

As stated before, information is written after the previously stored information has been erased on both sides of the track centerline. However, it is possible to first effect the writing of desired information, and then the erasure on both sides of the written information.

Figure 12:
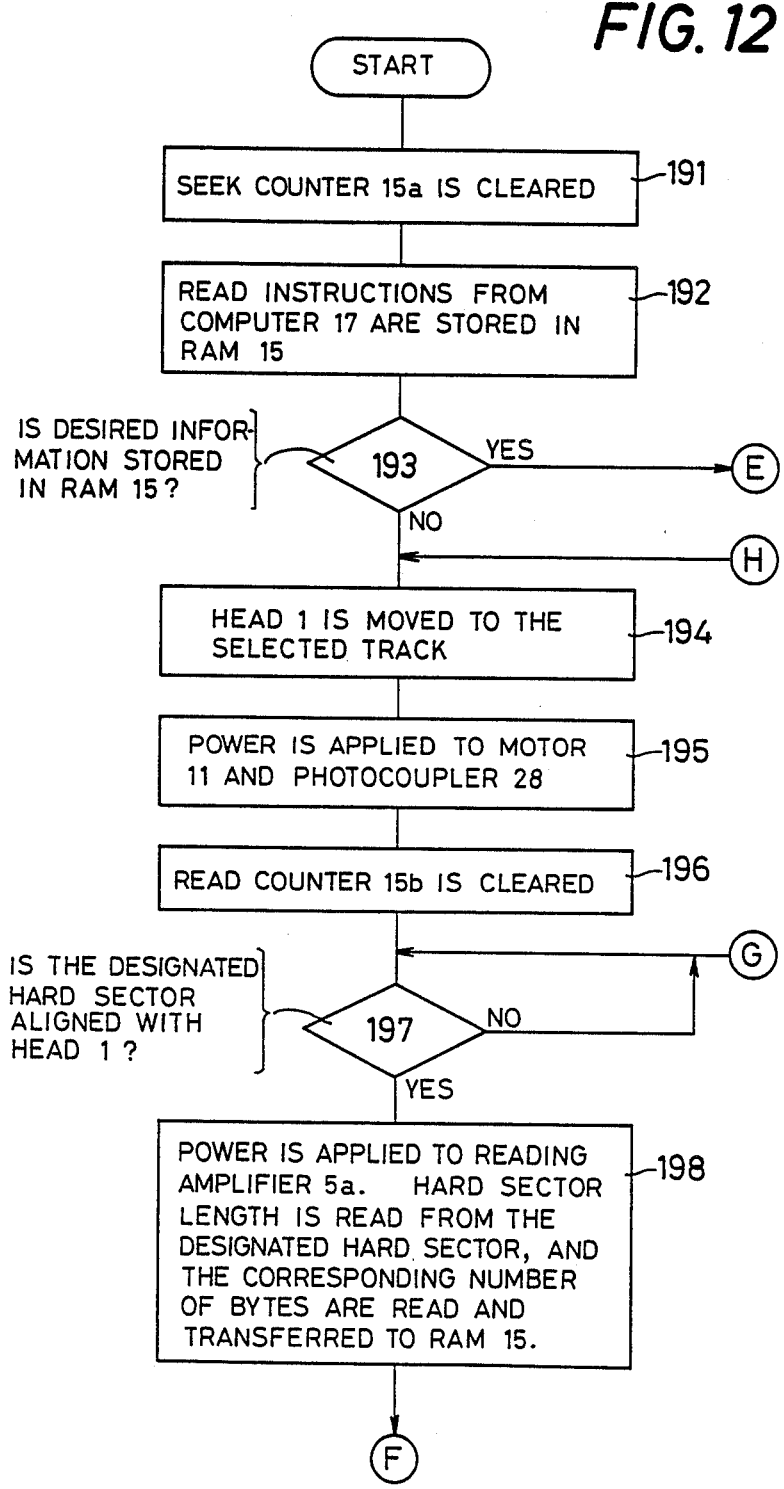

Referring further to FIGS. 12 and 13, the information reading routine as part of the operation in Step 147 of FIG. 7 will be described.

The CPU 8 first goes to Step 191 to clear the SEEK counter 15a of the RAM 15, and then to Step 192 wherein the CPU 8 receives READ instructions from the computer 17 and write in the RAM 15 the instruction data of the READ instructions which represent the identification numbers of a desired hard sector and its sub-sector Lp of the logical sector L on which information from the computer 17 is to be written. The Step 192 is followed by Step 193 to check if the information on the desired hard sector has already been stored in the RAM 15 or not. If the result of this checking in this step is affirmative, there is no need to read out the information from the desired hard sector of the disk 29, and the CPU 8 goes to Step 202 which will be described. If the checking in Step 193 reveals that the information on the desired hard sector has not been stored in the RAM 15, Step 194 is executed to move the magnetic head 1 into alignment with a track which contains the desired hard sector designated by the READ instructions. Successively, the CPU 8 goes to Step 195 to apply power to the disk-drive motor 11, and turn on the PHOTO SENSOR power disconnect switch 13b to apply power to the INDEX photocoupler 28. Then, the READ counter 15b of the RAM 15 is cleared in Step 196. In the next Step 197, the CPU 8 checks if the desired hard sector is aligned with the magnetic head 1. This checking is conducted by checking the output signal from the INDEX photocoupler 28. If the checking is negative, the disk 29 is kept rotated and the checking is continued until the desired one of the hard sectors of the selected track is moved to the maganetic head 1. When the desired hard sector is positioned at the magnetic head 1, the CPU 8 goes to Step 198 to turn on the READ AMP power disconnect switch 5c, read from the accessed hard sector the hard sector length data HL representative of the length of the hard sector, and transfer the corresponding number of bytes of information on the hard sector to the appropriate memory area of the RAM 15. Subsequently, the CPU 8 goes to Step 199 (FIG. 13) to calculate the CRC data of the information which has been transferred to the RAM 15, and compare the calculated CRC data, with the CRC data stored in the area IC of the hard sector and transferred to the RAM 15. That is, the CPU 8 checks if the calculated CRC data is identical to the stored CRC data. If the result of this checking is affirmative, the CPU 8 goes to Step 201 to check if the information transferred to the RAM 15 is the information stored on the desired hard sector. This checking is made by checking the hard sector identification number data HN contained in the transferred information. If the result of checking in Step 201 is affirmative, the CPU 8 goes to Step 202 to obtain the address number of the RAM 15 corresponding to the sub-sector Lp designated by the READ instructions from the computer 17, in the same manner as used in the previously indicated Step 166. Then, the CPU 8 transfers the designated sub-sector information from the RAM 15 to the computer 17. Thus, the information reading routine is terminated. In the event the result of checking in Step 200 or 201 is negative, the CPU 8 goes to Step 203 to increment the READ counter 15b, and to Step 204 to check if the count of the READ counter 15b is equal to "4" or not. If not, the CPU 8 goes back to Step 197. If the count of the READ counter 15b is equal to "4", the next Step 205 is executed to increment the SEEK counter 15a. Successively, the CPU 8 goes to Step 206 to check if the count of the SEEK counter 15a is equal to "4" or not. If not, the CPU 8 goes to Step 207 to turn on the PHOTO SENSOR power disconnect swtich 13b to apply power to the HEAD POSITION photocoupler 33. The Step 207 is followed by Step 208 wherein the magnetic head 1 is moved to the track No. 0 position, and then followed by Step 209 wherein the HEAD POSITION photocoupler 33 is turned off. Then, the CPU 8 goes back to Step 194. In the event the checking in Step 206 reveals that the count of the SEEK counter 15a is equal to "4", Step 210 is implemented to feed the ERROR signal to the computer 17, and the information routine is terminated. In short, the transfer of the information from the accessed hard sector to the RAM 15 is attempted up to four times if the CRC data is not found correct, or if the accessed hard sector is not the hard sector designated by the READ instructions from the computer 17. If the information on the designated hard sector can not be correctly transferred to the RAM 15 even with the maximum four times of attempts, the maganetic head 1 is returned to the track No. 0 position to again attemp the accessing to the designated hard sector and the transfer of the information thereon to the RAM 15. The magnetic head 1 is returned to the track No. 0 position up to four times for the same purpose. In the case where the transfer of the desired information to the RAM 15 can not be achieved with the repetition of the above-indicated attempts, the ERROR signal is produced in Step 210.

Referring finally to FIG. 14, the operation to position the magnetic head 1 will be described in detail.

At first, the CPU 8 goes to Step 221 to check if there exists a command which requires the magnetic head 1 to access to a given track of the recording disk 29, or not. If not, the CPU 8 waits for an accessing command. If there is an accessing command, the CPU 8 goes to Step 222 to check if the commanded accessing requires the magnetic head 1 to move radially outwardly of the disk 29. If the accessing requires a radially inward movement of the magnetic head 1 or requires the magnetic head 1 to remain at the current position, the CPU 8 goes to Step 223 wherein the CARRIAGE FEED buffer 15c is set to operate the magnetic head 1 by the number of steps corresponding to a distance between the current and commanded positions of the magnetic head 1, plus two additional steps which correspnd to two changes in energization phase of the motor 10. The reason for this setting will be described later. Then, the CPU 8 goes to Step 224 wherein the stepping motor 10 is energized according to data in the EXCITATION PHASE buffer 15d, which data represents a particular energization phase of the windings of the motor 10.

It is noted that the magnetic head 1 is automatically moved to the track No. 0 position when the magnetic recording system 6 is initially turned on, as shown at Step 142 in FIG. 7. The EXCITATION PHASE buffer 15d stores, as its intial content, data representative of the phase of energization of the coil windings of the motor 10 which was established at the time of completion of the movement of the magnetic head 1 to the track No. 0 position. Therefore, the first energization of the motor 10 in Step 224 after power application to the system 6 is carried out based on the content of the EXCITATION PHASE buffer 15d which represent the energization phase at the end of the preceding operation of the motor 10 to move the magnetic head 1 to the track No. 0 position when the system 6 was initially turned on.

Subsequently, the CPU 8 goes to Step 225 wherein the content of the CARRIAGE FEED buffer 15c is decremented by an amount corresponding to one increment step of the stepping motor 10. This step is followed by Step 226 to check if the content of the CARRIAGE FEED buffer 15c is zero or not. If not, the CPU 8 goes to Step 227 wherein the EXCITATION PHASE buffer 15d is set to provide data which causes the stepping motor 10 to be energized so as to move the carriage 9 radially inwardly of the disk 29 by a distance corresponding to one increment step of the motor 10. Then, the CPU 8 goes back to Step 224. Thus, the Steps 224-227 are repeatedly executed until the magnetic head 1 (carriage 9) is moved to the commanded position. When the content of the CARRIAGE FEED buffer 15c has been reduced to zero, the CPU 8 goes from Step 226 to Step 228 to set the EXCITATION PHASE buffer 15d to provide data which causes the stepping motor 10 to be energized to move the carriage 9 radially outwardly of the disk 29 by a distance corresponding to one increment step of the motor 10. Successively, the CPU 8 goes to Step 229 wherein the stepping motor 10 is energized according to the content of the EXCITATION PHASE buffer 15d. That is, the motor 10 is operated by one step. Then, the CPU 8 goes to Step 230 to remove power from the carriage-drive stepping motor 10.

If the checking in Step 222 reveals that the commanded accessing requires the magnetic head 1 to move radially outwardly of the disk 29, the CPU 8 goes to Step 231 wherein the CARRIAGE FEED buffer 15c is set to operate the motor 10 by the number of steps corresponding to a distance between the current and commanded positions of the magnetic head 1, plus one step. The reason for this setting of the buffer 15c will be described later. Then, the CPU 8 goes to Step 232 wherein the stepping motor 10 is energized according to the content of the EXCITATION PHASE buffer 15d. Subsequently, the CPU 8 goes to Step 233 wherein the content of the CARRIAGE FEED buffer 15c is decremented by an amount corresponding to one increment step of the stepping motor 10. This step is followed by Step 234 to check if the content of the CARRIAGE FEED buffer 15c is zero or not. If the content is zero, the CPU 8 goes to the previously indicated Step 230. If not, the CPU 8 goes to Step 235 wherein the EXCITATION PHASE buffer 15d is set to provide data which causes the stepping motor 10 to be energized so as to move the carriage 9 radially outwardly of the disk 29 by a distance corresponding to one increment step of the motor 10. Then, the CPU 8 goes back to Step 232. Thus, the Steps 232-235 are repeatedly executed until the carriage 9 is moved to the commanded track position.

When the stepping motor 10 is first energized in Step 224 or 232 after an accessing command has been entered, the energization is effected based on the content of the EXCITATION PHASE buffer 15d which represents the phase of the last energization of the windings of the motor 10 in the preceding operation of the motor 9 performed on the last accessing command. Namely, the first energization of the windings will not contribute to rotation of the rotor of the motor 10. This arrangement is provided because the stepping motor 10 is not supplied with electric power while the movement of the magnetic head 1 is not required that is, while an accessing command is not present. In other words, the motor windings are not kept energized in the phase which was established at the end of operation of the motor 10 in the preceding cycle. Therefore, the first energization of the windings after each accessing command is intended just to establish the phase of the last energization in the preceding operating cycle of the motor 10, for the purpose of permitting an easy, smooth start of the motor 10 even if the rotor was possibly slightly displaced, during the deenergization period, in a direction opposite to the direction of rotation that causes the magnetic head 1 to move to the commanded position. For this reason, one or two additional steps are set in the CARRIAGE FEED buffer 15c in Step 223 or 231, respectively, and the magnetic head 1 is moved beyond the commanded position by a one-step distance before Step 228 is executed, or moved to the commanded position before Step 230 is executed.

Further, as described before, the carriage 9 is always stopped after it is moved in a predetermined direction, i.e., after it is moved radially outwardly of the recording disk 29. This arrangement of unidirectional positioning of the carriage 9 is intended to prevent an adverse effect of a backlash between the lead screw 10b and the engagement piece 9a (fixed at its one end to the carriage 9), on the positioning accuracy of the carriage 9.

The carriage-drive stepping motor 10 is a four-phase motor the two coils L1 and L2 of which are simultaneously energized in a two-phase excitation mode. For example, when the low-level signal is applied to the input terminal I1 and the high-level signal is applied to the input terminal I2, the transistors Q2, Q4 and Q6 are turned OFF and the transistor Q3 is turned ON, whereby the transistors Q1 and Q5 are turned ON. The left terminal of the coil L1 is kept at approx. 3.6 V because of a voltage drop from the stabilized 5 V level of the DC-DC converter Co due to two pn connections, one at the diode Db and the other between the base and emitter of the transistor Q1. This potential (3.6 V) is kept substantially constant even when the output voltage of the power source battery B1 is more or less declined. In other words, even while the battery B1 is new and its output voltage is higher than 3.6 V, the impedance of the transistor Q1 is changed according to the voltage between its collector and emitter since the transistor Q1 operates in its linear region, and the left terminal of the coil L1 is kept at about 3.6 V. Hence, a substantially constant amount of current flows through the coil L1 in a direction from its left terminal toward its right terminal, irrespective of variations in the output voltage of the battery B1.

In the event the output voltage of the battery B1 has fallen below 3.7 V, the oscillation of the DC-DC converter Co is stopped to inhibit the operation of the circuit Ci1, in order to protect the circuit Ci1 and prevent the stepping motor 10 from failing to operate with satisfactory performance.

If the high-level signal is applied to the input terminal I1 while the low-level signal is applied to the input terminal I2, the transistors Q1, Q3 and Q5 are turned OFF, and the transistors Q2, Q4 and Q6 are turned ON. In this instance, a substantially constant amount of current flows through the coil L1 from its right terminal to its left terminal, irrespective of variations in the output voltage of the battery B1.

Thus, the energization phase of the coil L1 is changed depending upon the level of the siganls applied to the input terminals I1 and I2. The circuit Ci2 is operated in the same manner as the circuit Ci1.

While it is possible to use a total of four zener diodes to establish the base potential of the transistors Q1 and Q4 of the circuit Ci1, and that of the corresponding transistors of the circuit Ci2, the circuits Ci1 and Ci2 of the illustrated embodiment are powered by a common stabilized 5V power source, which permits improved operating consistency between the transistors.

What is claimed is:

1. An information recording and reading system, comprising:

a first drive unit for rotating a rotatable data-storage medium;

a read/write device including a read/write head for reading and writing information from and on said data-storage medium, a reading amplifier for amplifying output signals from said read/write head which represent recorded information from said data-storage medium, and a writing amplifier for amplifying input signals to said read/write head which represent input information to be written on said data-storage medium;

a power source from which electric power is supplied to said reading and writing amplifiers;

a first and a second power disconnect switch connected to said power source, and to said reading and writing amplifiers, respectively;

a memory storing a control program for controlling the operation of the recording and reading system; and control means connected to said first and second power disconnect switches, and operated according to said control program for controlling the operation of said first and second power disconnect switches, wherein said reading amplifier is disconnectd by said first power disconnect switch from said power source while said writing amplifier is operated, and wherein said writing amplifier is disconnected by said second power disconnect switch from said power source while said reading amplifier is operated.

2. An information recording and reading system, comprising:

a drive unit for rotating a rotatable datastorage medium;

a read/write device including a read/write head for reading and writing information from and on said data-storage medium, a rotating member rotated by said drive unit to rotate said data-storage medium, a first detector disposed adjacent to said rotating member for sensing an angular position of said rotating member, and a second detector for sensing a predetermined position of said read/write head in a radial direction of said data-storage medium;

a power source from which electric power is supplied to said first and second detectors;

a first and a second power disconnect switch connected to said power source, and to said first and second detectors, respectively;

a memory storing a control program for controlling the operation of the recording and reading system; and control means connected to said first and second power disconnect switches, and operated according to said control program for controlling the operations of said first and second power disconnect switches, wherein said first detector is disconnectd by said first power disconnect switch from said power source while said second detector is operated, and wherein said second detector is disconnected by said second power disconnect switch from said power source while said first detector is operated.

3. The information recording and reading system of claim 2, wherein said rotating member has at least one slot sensed by said first detector.

4. The information recording and reading system of claim 2, wherein said first detector comprises a photoelectric switch.

5. The information recording and reading system of claim 2, wherein said read/write device includes another drive unit having a drive motor for moving said read/write head radially with respect to said data-storage medium, said another drive unit further having a carriage carrying said read/write head and movable by said drive motor to position said read/write head, said second detector sensing a position of said carriage.

6. The information recording and reading system of claim 5, wherein said carriage has a dog, and said second detector comprises a photoelectric switch disposed to sense said dog when said read/write head is aligned with a radially outermost data track of said data-storage medium.

* * * * *